(12) United States Patent
Li et al.

(10) Patent No.: US 9,316,844 B2
(45) Date of Patent: Apr. 19, 2016

(54) 3D DISPLAY APPARATUS AND METHOD FOR MANUFACTURING THE SAME

(71) Applicant: BOE TECHNOLOGY GROUP CO., LTD., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/127,124

(22) PCT Filed: Dec. 3, 2012

(86) PCT No.: PCT/CN2012/085758
§ 371 (c)(1),
(2) Date: Dec. 17, 2013

(87) PCT Pub. No.: WO2014/015606
PCT Pub. Date: Jan. 30, 2014

(65) Prior Publication Data
US 2015/0077665 A1 Mar. 19, 2015

(30) Foreign Application Priority Data
Jul. 27, 2012 (CN) .......................... 2012 1 0265389

(51) Int. Cl.
*G02F 1/1335* (2006.01)
*G02B 27/26* (2006.01)
(Continued)

(52) U.S. Cl.
CPC ............... *G02B 27/26* (2013.01); *C09K 19/02* (2013.01); *C09K 19/60* (2013.01);
(Continued)

(58) Field of Classification Search
None
See application file for complete search history.

(56) References Cited

U.S. PATENT DOCUMENTS 6,211,933 B1 * 4/2001 Mizunuma et al. ............. 349/96
7,468,838 B2 * 12/2008 Cha et al. ...................... 359/465
(Continued)

FOREIGN PATENT DOCUMENTS

CN          1847926 A      10/2006
CN        102073142 A       5/2011
(Continued)

OTHER PUBLICATIONS

Author: Chae et al., Title: Three-dimensional display system using a variable parallax barrier and eye tracking, Date: Aug. 2011, Publisher: Optical Engineering, Edition or vol. 50(8), p. 087401.*
(Continued)

*Primary Examiner* — Dung Nguyen
*Assistant Examiner* — Shan Liu
(74) *Attorney, Agent, or Firm* — Ladas & Parry LLP

(57) ABSTRACT

A 3D display apparatus and manufacturing method thereof are provided, and the 3D display apparatus comprises: a liquid crystal display panel; and a first polarizing filter and a second polarizing filter respectively attached to both sides of the liquid crystal display panel; a grating functional structure on the second polarizing filter, wherein a stripe direction of the grating functional structure may be controlled to form a different predetermined angle with a horizontal direction; a polarizing filter functional structure on the grating functional structure, wherein the functional states of the polarizing filter functional structure may be controlled to switch between effective and ineffective. The 3D display apparatus can achieve a compatible switching between a glasses type 3D displaying mode and a naked-eye 3D displaying mode on the same 3D display apparatus.

5 Claims, 5 Drawing Sheets

(51) Int. Cl.
  *G02B 27/22* (2006.01)
  *H04N 13/04* (2006.01)
  *C09K 19/02* (2006.01)
  *G02F 1/1343* (2006.01)
  *G02F 1/137* (2006.01)
  *C09K 19/60* (2006.01)
  *G02F 1/13363* (2006.01)

(52) U.S. Cl.
  CPC .......... *G02B 27/2214* (2013.01); *G02F 1/137* (2013.01); *G02F 1/134336* (2013.01); *H04N 13/0413* (2013.01); *H04N 13/0434* (2013.01); *H04N 13/0497* (2013.01); *G02F 2001/133631* (2013.01); *G02F 2001/133638* (2013.01)

(56) References Cited

U.S. PATENT DOCUMENTS

| | | | | |
|---|---|---|---|---|
| 8,786,683 | B2 * | 7/2014 | Akita | G02B 27/2214 345/419 |
| 2006/0221443 | A1 | 10/2006 | Cha et al. | |
| 2007/0103547 | A1 * | 5/2007 | Kim et al. | 348/55 |
| 2009/0167968 | A1 * | 7/2009 | Hsu | G02B 27/2214 349/15 |
| 2011/0122128 | A1 | 5/2011 | Akita | |
| 2012/0105409 | A1 * | 5/2012 | Tsai | G02F 1/1323 345/211 |
| 2012/0113336 | A1 * | 5/2012 | Kim | G02F 1/134363 349/15 |
| 2012/0307168 | A1 * | 12/2012 | Dong et al. | 349/15 |
| 2013/0135719 | A1 * | 5/2013 | Tsai | 359/462 |

FOREIGN PATENT DOCUMENTS

| | | |
|---|---|---|
| CN | 102778757 A | 11/2012 |
| EP | 1186941 A1 | 3/2002 |

OTHER PUBLICATIONS

International Search Report mailed Apr. 25, 2013; PCT/CN/2012/085758.

First Chinese Office Action dated Mar. 7, 2014; Appln. No. 201210265389.3.

International Preliminary Report on Patentability Appln. No. PCT/CN2012/085758; Dated Jan. 27, 2015.

\* cited by examiner

-Prior Art-

-Prior Art-

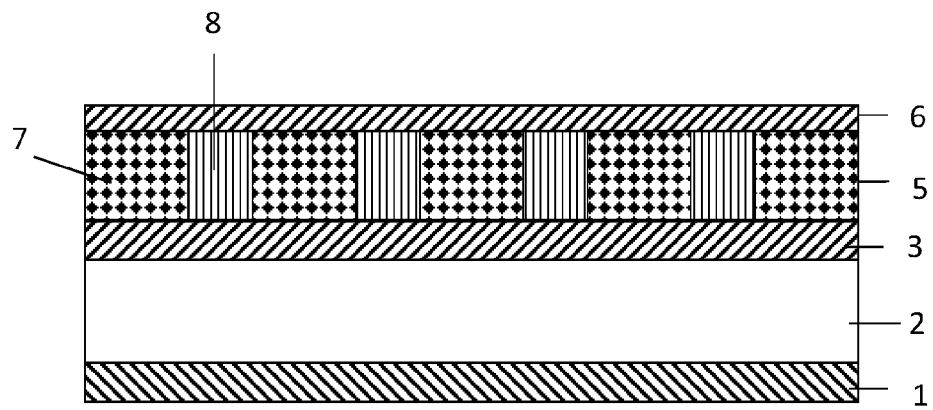
-Prior Art- FIG. 3
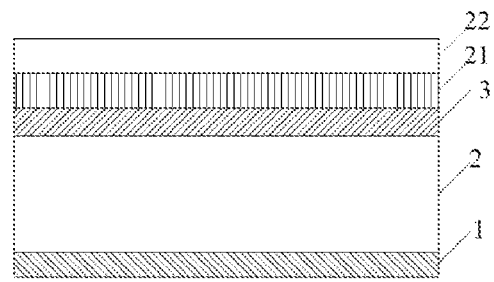
FIG. 4
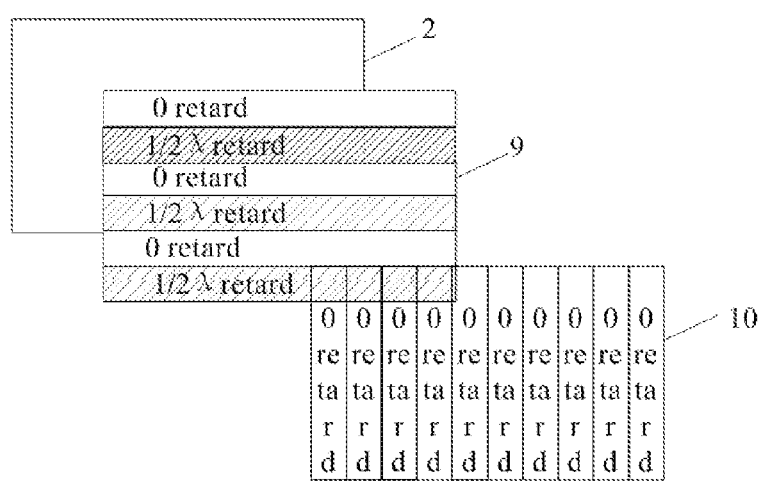
FIG. 5

3D DISPLAY APPARATUS AND METHOD FOR MANUFACTURING THE SAME

TECHNICAL FIELD

The embodiments of the present invention relate to a 3D display apparatus and method for manufacturing the same.

BACKGROUND

As is well known, a 2D display, which is commonly seen by people, can not provide information regarding depth of field like the real world. The key reason why people can distinguish the depth of field (3D effect) is that two eyes of human have a position difference produced by a pupil distance of about 60 mm. Two pictures having "binocular parallax" become a pair of "stereoscopic pictures", and it produces a stereoscopic effect through the combination of cerebral visual cortex of the human.

3D displaying modes are classified as a naked-eye type 3D displaying mode and a glasses type 3D displaying mode. Currently, the mainstream technology of the glasses type 3D displaying mode has a shutter glass technology and a pattern retard technology; while the naked-eye type 3D displaying mode mainly have technologies such as parallax barrier grating, lenticular lens grating and so on. Among the naked-eye type 3D displaying mode, the technology of parallax barrier grating is most maturely applied, and ruling film type, black matrix (BM) type, reflective BM type, active barrier type, etc. can be used as grating materials.

The glasses type 3D displaying mode and the naked-eye type 3D displaying mode have their own advantages and disadvantages. The glasses type 3D displaying mode has to wear glasses, but has a relatively less crosstalk; however, the naked-eye type 3D displaying mode does not have to wear glasses, but has relatively more crosstalk. Generally, the 3D displays in the prior art can only adopt one 3D displaying mode, however, as to a same 3D display, it can achieve better displaying effect if different 3D displaying modes are used for different situations.

SUMMARY

Embodiments of the present invention provide the following technical solutions:

On one aspect, there is provided a 3D display apparatus, comprising:
a liquid crystal display panel;
a first polarizing filter and a second polarizing filter, respectively attached to both sides of the liquid crystal display panel;
The 3D display apparatus further comprises:
a grating functional structure on the second polarizing filter, a stripe direction of the grating functional structure may be controlled to form a different predetermined angle with a horizontal direction;
a polarizing filter functional structure on the grating functional structure, the functional states of the polarizing filter functional structure may be controlled to switch between effective and ineffective, when the functional state of the polarizing filter functional structure is effective, the polarizing filter functional structure adsorbs one of two linear polarizing light components orthogonal to each other of an incident light; and when the functional state of the polarizing filter functional structure is ineffective, all of the incident light can be transmitted through the polarizing filter functional structure.

Further, the grating functional structure comprises a first grating unit on the second polarizing filter and a second grating unit on the first grating unit, a stripe direction of the first grating unit is parallel to the horizontal direction, and a stripe direction of the second grating unit is parallel to a vertical direction,
in a glasses type 3D displaying mode, only the first grating unit is controlled to function; in a naked-eye type 3D displaying mode, only the second grating unit is controlled to function.

Further, the grating functional structure comprises a first grating unit on the second polarizing filter and a second grating unit on the first grating unit, a stripe direction of the first grating unit is parallel to the horizontal direction, and a stripe direction of the second grating unit forms a certain angle with a vertical direction,
in the glasses type 3D displaying mode, only the first grating unit is controlled to function; in the naked-eye type 3D displaying mode, only the second grating unit is controlled to function.

Further, the grating functional structure comprises:
a first substrate and a second substrate disposed to be opposite to each other;
a liquid crystal layer between the first substrate and the second substrate;
a plurality of rows of pixel electrodes parallel to the horizontal direction are disposed on the first substrate, the pixel electrodes in odd numbered rows are connected with each other and connected with a lead line a, and the pixel electrodes in even numbered rows are connected with each other and connected with a lead line b; a plurality of rows of pixel electrodes parallel to the vertical direction are disposed on the second substrate, the pixel electrodes in odd numbered rows are connected with each other and connected with a lead line c, and the pixel electrodes in even numbered rows are connected with each other and connected with a lead line d;
in the glasses type 3D displaying mode, the lead lines a, c and d are controlled to be connected with a common electrode, and the lead line b is controlled to be connected with a driving voltage Vop; or, the lead lines b, c and d are controlled to be connected with the common electrode, and the lead line a is controlled to be connected with the driving voltage Vop;
in the naked-eye type 3D displaying mode, the lead lines a, b and c are controlled to be connected with the common electrode, and the lead line d is controlled to be connected with the driving voltage Vop; or, the lead lines a, b and d are controlled to be connected with the common electrode, and the lead line c is controlled to be connected with the driving voltage Vop.

Further, the grating functional structure comprises:
a first substrate and a second substrate disposed to be opposite to each other;
a liquid crystal layer between the first substrate and the second substrate;
a plurality of rows of pixel electrodes parallel to the horizontal direction are disposed on the first substrate, the pixel electrodes in odd numbered rows are connected with each other and connected with a lead line a, and the pixel electrodes in even numbered rows are connected with each other and connected with a lead line b; a plurality of rows of pixel electrodes forming a certain angle with the vertical direction are disposed on the second substrate, the pixel electrodes in odd numbered rows are connected with each other and connected with a lead line c, and the pixel electrodes in even numbered rows are connected with each other and connected with a lead line d;

in the glasses type 3D displaying mode, the lead lines a, c and d are controlled to be connected with a common electrode, and the lead line b is controlled to be connected with a driving voltage Vop; or, the lead lines b, c and d are controlled to be connected with the common electrode, and the lead line a is controlled to be connected with the driving voltage Vop;

in the naked-eye type 3D displaying mode, the lead lines a, b and c are controlled to be connected with the common electrode, and the lead line d is controlled to be connected with the driving voltage Vop; or, the lead lines a, b and d are controlled to be connected with the common electrode, and the lead line c is controlled to be connected with the driving voltage Vop.

Further, a distance between adjacent rows of the pixel electrodes is 3-5 μm.

Further, the polarizing filter functional structure comprises:

a third substrate and a fourth substrate disposed to be opposite to each other;

liquid crystal molecules disposed between the third substrate and the fourth substrate and formed of a Nematic phase liquid crystal and a dichromatism dye;

the original orientation of the liquid crystal molecules is parallel to the third substrate, and after applying electric field to the polarizing filter functional structure, the orientation of the liquid crystal molecules is vertical to the third substrate.

Embodiments of the present invention further provide a method for manufacturing the above 3D display apparatus, comprising:

forming a liquid crystal display panel;

forming a first and second polarizing filters on both sides of the liquid crystal display panel, respectively;

the manufacturing method further comprises:

forming a grating functional structure on the second polarizing filter, a stripe direction of the grating functional structure may be controlled to form a different predetermined angle with a horizontal direction;

forming a polarizing filter functional structure on the grating functional structure, the functional states of the polarizing filter functional structure may be controlled to switch between effective and ineffective, when the functional state of the polarizing filter functional structure is effective, the polarizing filter functional structure adsorbs one of two linear polarizing light components orthogonal to each other of an incident light; when the functional state of the polarizing filter functional structure is ineffective, all of the incident light can be transmitted through the polarizing filter functional structure.

BRIEF DESCRIPTION OF THE DRAWINGS

In order to describe the technical solutions of the embodiments of the present invention, it will give a brief description to the figures of the embodiments below. Obviously, the below described figures are only relate some embodiments of the present invention, and not intended to restrict the present invention.

FIG. 3 is a structural schematic view of a 3D display panel in a naked-eye type 3D displaying mode in the prior art;

FIG. 4 is a structural schematic view of a 3D display apparatus of an embodiment of the present invention;

FIG. 5 is a schematic view of displaying of a grating functional structure in the glasses type 3D displaying mode of a first embodiment of the present invention;

DETAILED DESCRIPTION

To make aims, technical solutions and advantages of the embodiments of the present invention more clear, the technical solutions of the embodiments of the present invention will be described below clearly and fully in combination with the figure of the embodiments of the present invention. Obviously, the described embodiments are a portion of the embodiments of the present invention, not all the embodiments. Based on the described embodiments of the present invention, all other embodiments, which can be obtained by those skilled in the art without giving creative labor, belong to the scope protected by the present invention.

With respect to the problem that the 3D display in the prior art generally can only use one 3D displaying mode, the embodiments of the present invention provide a 3D display apparatus and method for manufacturing the same, which can achieve a compatible switching between a glasses type 3D displaying mode and a naked-eye 3D displaying mode on the same 3D display apparatus.

Figure 2:
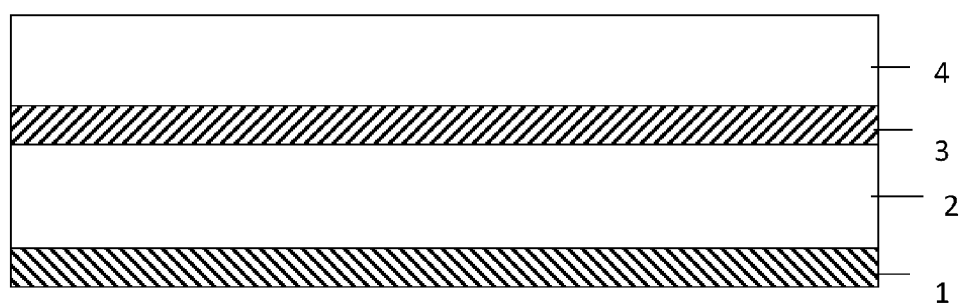
FIG. 2 is a structural schematic view of a 3D display panel in the glasses type 3D displaying mode in the prior art.

FIG. 2 is a structural schematic view of a 3D display panel in the glasses type 3D displaying mode in the prior art. As shown in FIG. 2, the 3D display panel comprises a first polarizing filter 1, a liquid crystal display panel 2, a second polarizing filter 3, and a grating 4.

Figure 1:
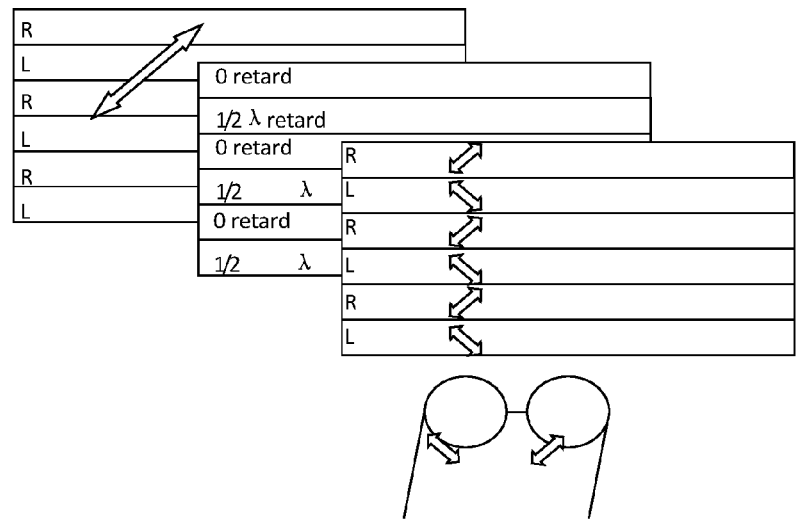
FIG. 1 is a schematic view of displaying of a glasses type 3D displaying mode in the prior art.

The principle of the polarizing glasses type 3D displaying mode in the prior art is shown in FIG. 1 and it is from top to bottom in FIG. 1: a picture displayed by a display panel, a phase difference plate, an emitting picture and a polarizing glasses for viewing. On the display panel, one row displays a picture for a right eye, and one row displays a picture for a left eye; and a phase difference plate is disposed in front of the display panel, one row is of $\lambda/2$ retardation, one row is of 0 retardation, one row is of $\lambda/2$ retardation, one row is of 0 retardation, . . . , one row is of $\lambda/2$ retardation, one row is of 0 retardation, and it is arranged alternately in this way, $\lambda$ is a wavelength of a light. In this way, it may cause a polarizing direction of the emitting light of the pixel retarded by $\lambda/2$ to rotate 90°, thus by wearing a polarizing glasses with the polarizing directions of the left and right eyes orthogonal to each other, it is possible that the right eye only sees the light emitted by the right eye pixel, and the left eye only sees the light emitted by the left eye pixel, so as to generate a stereo effect. In addition, the arrangement on the phase difference plate may also be one row of λ/4 retardation, one row of 3λ/4 retardation, one row of λ/4 retardation, one row of 3λ/4 retardation, . . . , one row of λ/4 retardation, one row of 3λ/4 retardation.

Such phase difference plate may be replaced by a liquid crystal display panel, and the liquid crystal display panel may achieve functions of 0 retardation and λ/2 retardation by using a Twisted Nematic (TW) mode or a Vertical Alignment (VA) mode.

The naked-eye type 3D displaying mode may be achieved by using a polarizing grating. As shown in FIG. 3, a 3D display panel in the naked-eye type 3D displaying mode in the prior art comprises a first polarizing filter 1, a liquid crystal display panel 2, a second polarizing filter 3, a polarizing grating 5, and a third polarizing filter 6. The light having passed the second polarizing filter 3 on the liquid crystal display panel 2 goes through the designed polarizing grating 5. The polarizing grating 5 being used has two polarizing state regions: a first region 7 and a second region 8, the first region 7 generates a phase retardation of λ/2, and the light is blocked after passing the third polarizing filter 6; the second region 8 is of zero phase retardation, and the light can still be emitted after passing the third polarizing filter 6, thus the naked-eye type 3D displaying can be achieved by the polarizing grating 5 and the third polarizing filter 6.

In order to achieve a compatible switching between the glasses type 3D displaying mode and the naked-eye 3D displaying mode on the same 3D display apparatus, it needs to solve two main problems.

The first problem is to achieve the compatible of the grating. However, currently, the design of the grating stripe and stripe arrangement direction in the two displaying modes are different. In the polarizing glasses type 3D displaying mode, the grating stripe is disposed horizontally (i.e. parallel to a horizontal direction); while in the naked-eye type 3D displaying mode, the grating stripe is disposed vertically (i.e. vertical to the horizontal direction) or inclined (i.e. forming a certain angle with the horizontal direction);

The second problem is to make the third polarizing filter 6 compatible to the polarizing glasses type 3D displaying mode. The third polarizing filter 6 is an essential component of the polarizing grating in the naked-eye type 3D displaying mode, however, in the glasses type 3D displaying mode, it has no function and would influence the stereo displaying effect.

An embodiment of the present invention provides a 3D display apparatus, which can achieve a compatible switching between the glasses type 3D displaying mode and the naked-eye 3D displaying mode on the same 3D display apparatus. As shown in FIG. 4, the present embodiment comprises:

a liquid crystal display panel 2;

a first polarizing filter 1 and a second polarizing filter 3 respective attached to both sides of the liquid crystal display panel 2;

a grating functional structure 21 on the second polarizing filter 3, a stripe direction of the grating functional structure 21 may be controlled to form a different predetermined angle with a horizontal direction;

a polarizing filter functional structure 22 on the grating functional structure 21, the functional states of the polarizing filter functional structure 22 may be controlled to switch between effective and ineffective, when the functional state of the polarizing filter functional structure is effective, the polarizing filter functional structure adsorbs one of two linear polarizing light components orthogonal to each other of an incident light; when the functional state of the polarizing filter functional structure is ineffective, all of the incident light can be transmitted through the polarizing filter functional structure.

It needs to enable the grating functional structure 21 to be applied to the glasses type 3D displaying mode and the naked-eye type 3D displaying mode at the same time, and the implementation of the grating functional structure 21 may have the following two optional embodiments.

Embodiment 1

Figure 6:
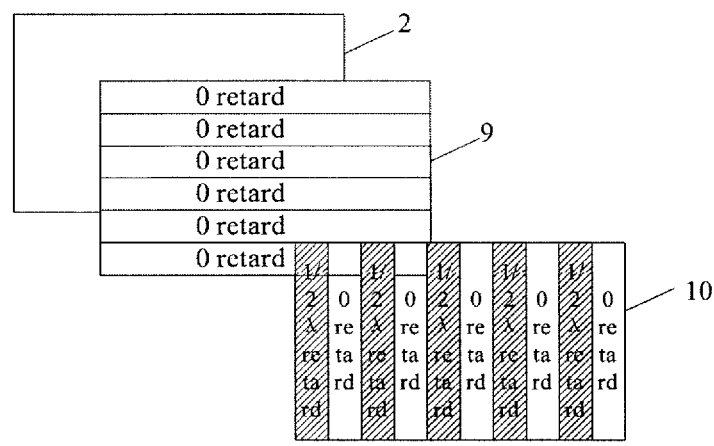
FIG. 6 is a schematic view of displaying of a grating functional structure in the naked-eye type 3D displaying mode of a first embodiment of the present invention.

As shown in FIGS. 5 and 6, the grating functional structure 21 is constituted by a first grating unit 9 on the second polarizing filter 3 and a second grating unit 10 on the first grating unit 9, the stripe direction of the first grating unit 9 is parallel to the horizontal direction, and the stripe direction of the second grating unit 10 is parallel to the vertical direction. Both of the first grating unit 9 and the second grating unit 10 may be achieved by liquid crystal devices.

When it requires to achieve a polarizing glasses type 3D displaying, the first grating unit 9 is controlled to function as a pattern of horizontal stripes alternating as shown in FIG. 5, according to the sequence of one row of λ/2 retardation, one row of 0 retardation, one row of λ/2 retardation, one row of 0 retardation, . . . , one row of λ/2 retardation, one row of 0 retardation, and it is arranged alternately in this way; while the second grating unit 10 is controlled to be zero retardation or λ/2 retardation, and the second grating unit 10 does not function. At the same time, the data content and format of the liquid crystal display panel 2 is correspondingly driven to match the polarizing glasses type 3D displaying mode.

When it requires to achieve the naked-eye type 3D displaying, as shown in FIG. 6, the first grating unit 9 is controlled to be of zero retardation or λ/2 retardation, and the first grating unit 9 does not function; while the second grating unit 10 is controlled to function as a pattern of vertical stripes alternating according to the sequence of one row of λ/2 retardation, one row of 0 retardation, one row of λ/2 retardation, one row of 0 retardation, . . . , one row of λ/2 retardation, one row of 0 retardation, and it is arranged alternately in this way, so as to act as a core component of the polarizing grating. At the same time, the data content and format of the liquid crystal display panel 2 is correspondingly driven to match the naked-eye type 3D displaying mode.

Further, when achieving the naked-eye type 3D displaying, it may also make the stripe direction of the second grating unit to form a certain angle with the vertical direction, thus it may reduce moire stripe. The angle is in the range of 0~90°. For example, the angle is smaller than 45°. In particular, the angle may be set according to a grating pitch and sub pixel pitch of the screen, to reduce the width of the moire stripe, and make the eyes of human could not distinguish it.

Embodiment 2

Figure 7:
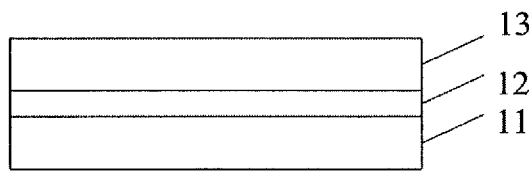
FIG. 7 is a structural schematic view of a grating functional structure of a second embodiment of the present invention.

The grating functional structure 21 is achieved by a liquid crystal device. As shown in FIG. 7, the grating functional structure 21 comprises: a first substrate 11 and a second substrate 13 disposed to be opposite to each other; and a liquid crystal layer 12 between the first substrate 11 and the second substrate 13.

Figure 8:
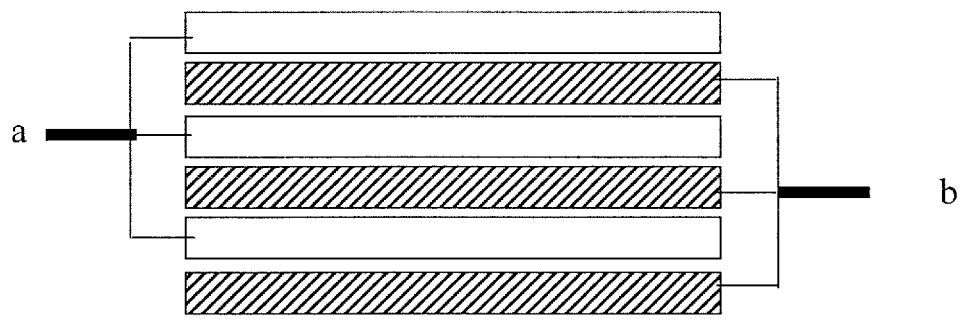
FIG. 8 is a schematic view of arrangement of a pixel electrode on a first substrate of the grating functional structure of the second embodiment of the present invention.
Figure 9:
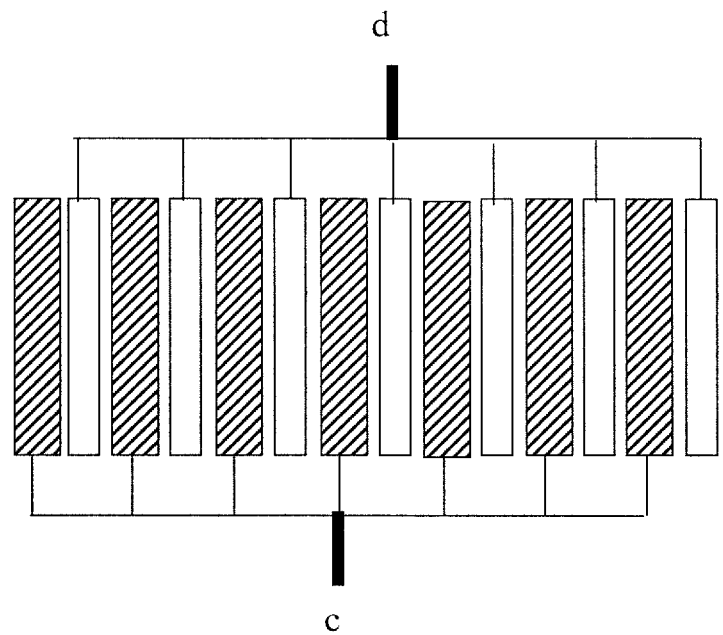
FIG. 9 is a schematic view of arrangement of a pixel electrode on a second substrate of the grating functional structure of the second embodiment of the present invention.

The electrode structure on the first substrate 11 is shown in FIG. 8, and a plurality of rows of pixel electrodes parallel to the horizontal direction are disposed on the first substrate 11, and the distance between adjacent rows of the pixel electrodes is 3-5 μm. If it is permitted by the process, the distance between adjacent rows of pixel electrodes is the smaller the better. The pixel electrodes in odd numbered rows are connected with each other and connected with a lead line a, and the pixel electrodes in even numbered rows are connected with each other and connected with a lead line b. The electrode structure on the second substrate 13 is shown in FIG. 9, and a plurality of rows of pixel electrodes parallel to the vertical direction are disposed on the second substrate 13, and the distance between adjacent rows of the pixel electrodes is 3-5 μm. If it is permitted by the process, the distance between adjacent rows of the pixel electrodes is the smaller the better. The pixel electrodes in odd numbered rows are connected with each other and connected with a lead line c, and the pixel electrodes in even numbered rows are connected with each other and connected with a lead line d.

To make such liquid crystal device achieve the function of the first grating unit 9, the lead lines c and d may be set to be connected with a common electrode, the lead line a is set to be connected with a driving voltage Vop, and the lead lines b is set to be connected with the common electrode; or, the lead lines b is set to be connected with the driving voltage Vop, and the lead line a is set to be connected with the common electrode, so as to achieve the pattern retardation in which odd and even rows of the liquid crystal device alternately have 0 and λ/2 phase differences, to achieve the function of the first grating unit 9 in FIG. 5.

To make such liquid crystal device achieve the function of the second grating unit 10, the lead lines a and b may be set to be connected with a common electrode, the lead line c is set to be connected with a driving voltage Vop, and the lead lines d is set to be connected with the common electrode; or, the lead lines d is set to be connected with the driving voltage Vop, and the lead line c is set to be connected with the common electrode, so as to achieve the pattern retardation in which odd and even rows of the liquid crystal device alternately have 0 and λ/2 phase differences, to achieve the function of the second grating unit 10 in FIG. 6.

Figure 10:
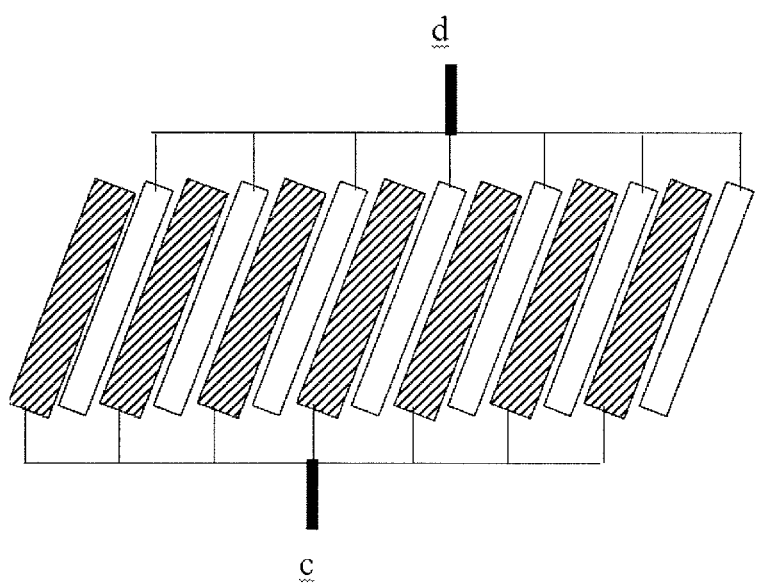
FIG. 10 is a schematic view of another arrangement of pixel electrodes on the second substrate of the grating functional structure of the second embodiment of the present invention.

Further, to reduce moire stripe, the electrode structure on the second substrate 13 may also be as shown in FIG. 10, and a plurality of rows of pixel electrodes forming a certain angle with the vertical direction are disposed on the second substrate 13, the pixel electrodes in odd numbered rows are connected with each other and connected with a lead line c, and the pixel electrodes in even numbered rows are connected with each other and connected with a lead line d. The angle formed with the vertical direction is in the range of 0~90°. For example, the angle is smaller than 45°. In particular, the angle may be set according to grating pitch and sub pixel pitch of the screen, to reduce the width of the moire stripe, and make the eyes of human could not distinguish it.

It may enable the grating functional structure 21 to be simultaneously applied to the glasses type 3D displaying mode and the naked-eye 3D displaying mode by the above embodiment 1 and embodiment 2.

The following needs to make the polarizing filter functional structure 22 being compatible to the glasses type 3D displaying mode and the naked-eye 3D displaying mode.

Embodiment 3

Figure 11A:
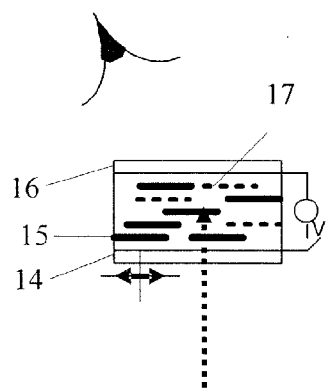
FIG. 11a-11b is a schematic view of displaying of a polarizing filter functional structure in the naked-eye type 3D displaying mode of a third embodiment of the present invention.
Figure 11B:
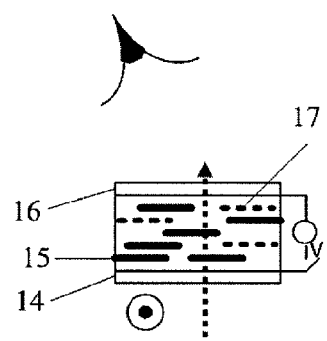
Figure 11C:
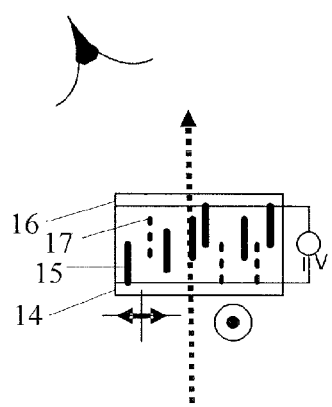
FIG. 11c is a schematic view of displaying of a polarizing filter functional structure in the glasses type 3D displaying mode of the third embodiment of the present invention.

As shown in FIG. 11a-11c, the polarizing filter functional structure 22 is achieved by using a liquid crystal device, and comprises:

a third substrate 14 and a fourth substrate 16 disposed to be opposite to each other;

liquid crystal molecules 15 disposed between the third substrate 14 and the fourth substrate 16 and formed of a Nematic phase liquid crystal and a dichromatism dye 17;

the original orientation of the liquid crystal molecules 15 is parallel to the third substrate 14, and after applying an electric field to the polarizing filter functional structure 22, the orientation of the liquid crystal molecules 15 is vertical to the third substrate 14.

The dichromatism dye is added into the liquid crystal material, and the dichromatism dye has the following features: with respect to two linear polarizing light components orthogonal to each other of an incident light, it only absorbs one of them and lets the other pass.

The original orientation of the liquid crystal molecules 15 in the liquid crystal cell is parallel or anti-parallel in up and down directions (i.e. parallel to the third substrate 14), and it is parallel or vertical to the polarizing direction of the incident polarizing light passing the liquid crystal cell. If the polarizing incident light is parallel to the director of the liquid crystal molecule 15, the light in the region is absorbed and the region acts as a blocking bar of the grating, as shown in FIG. 11(a); if the polarizing incident light is vertical to the director of the liquid crystal molecule 15, the light in the region can pass smoothly, and such region acts an opening of the grating, as shown in FIG. 11(b). Thus, the liquid crystal device doped by dichromatism dye may function as a polarizing filter, and achieve the naked-eye type 3D displaying.

In addition, when a 3D display apparatus is switched to a polarizing glasses type 3D displaying mode, it needs to cancel the function of polarizing filter of the polarizing filter functional structure 22, and guarantee that left and right eyes see images in different polarizing states. At this time, it only needs to apply an electric field on the liquid crystal device, to make the liquid crystal molecules 15 align along the direction of the electric field, as shown in FIG. 11c. At this time, the polarizing directions of the incident lights are all vertical to the director of the liquid crystal molecules 15, and all the lights can pass. Thus, it does not produce negative influence on the implementation of the polarizing glasses type 3D displaying mode.

In the above embodiment 3, it may enable the polarizing filter functional structure 22 to be applied to the glasses type 3D displaying mode and the naked-eye type 3D displaying mode.

The 3D display apparatus of the embodiments of the present invention may achieve the compatible switching between the glasses type 3D displaying mode and the naked-eye type 3D displaying mode, the stripe direction of the grating functional structure is controlled to form different angle with the horizontal direction, and the functional states of the polarizing filter functional structure is controlled to switch between effective and ineffective. It may cause the 3D display apparatus to switch between the glasses type 3D displaying mode and the naked-eye 3D type displaying mode, by controlling the stripe direction of the grating functional structure and the functional states of the polarizing filter functional structure.

Further, the 3D display apparatus of the embodiments of the present invention can also achieve being switched between 2D displaying and 3D displaying, and it only needs to control all of the first grating unit 9 and the second grating unit 10 of the grating functional structure 21 and the polarizing filter functional structure 22 not to function, thus it may achieve the 2D displaying.

An embodiment of the present invention further provides a method for manufacturing a 3D display apparatus corresponding to the above 3D display apparatus, the method comprising:

forming a liquid crystal display panel;

forming a first and second polarizing filters on both sides of the liquid crystal display panel, respectively;

forming a grating functional structure on the second polarizing filter, a stripe direction of the grating functional structure may be controlled to form a different predetermined angle with a horizontal direction;

forming a polarizing filter functional structure on the grating functional structure, the functional states of the polarizing filter functional structure may be controlled to switch between effective and ineffective, when the functional state of the polarizing filter functional structure is effective, the polarizing filter functional structure adsorbs one of two linear polarizing light components orthogonal to each other of an incident light; when the functional state of the polarizing filter functional structure is ineffective, all of the incident light can be transmitted through the polarizing filter functional structure.

According to the manufacturing method of 3D display apparatus of the embodiments of the present invention, a grating functional structure and a polarizing filter functional structure are formed on the second polarizing filter, a stripe direction of the grating functional structure is controlled to form a different predetermined angle with a horizontal direction, and the functional states of the polarizing filter functional structure is controlled to switch between effective and ineffective. It may cause the 3D display apparatus to switch between the glasses type 3D displaying mode and the naked-eye type 3D displaying mode, by controlling the stripe direction of the grating functional structure and the functional states of the polarizing filter functional structure.

All implementation means and applied situations in the above apparatuses are applicable to the embodiments of the method, and can also achieve the same technical functional states, so the same description is not repeated here.

In the various method embodiments of the present invention, the sequence numbers of the steps are not used to define the sequence, and those skilled in the art can understand, without paying creative work, variation of the sequence of the steps are within the protection scope of the present invention.

The foregoing is the exemplary embodiments of the present invention, and is not intended to define the protection scope of the present invention, the scope of which is determined by the appended claims.

What is claimed is:

1. A 3D display apparatus, comprising: a liquid crystal display panel and a first polarizing filter and a second polarizing filter respectively attached to both sides of the liquid crystal display panel, wherein the 3D display apparatus further comprises:

a grating functional structure on the second polarizing filter, wherein a stripe direction of the grating functional structure is controlled to form a different predetermined angle with a horizontal direction, wherein the grating functional structure comprises a first grating unit on the second polarizing filter and a second grating unit on the first grating unit, wherein a stripe direction of the first grating unit is parallel to the horizontal direction, and a stripe direction of the second grating unit is parallel to a vertical direction;

a polarizing filter functional structure on the grating functional structure, wherein functional states of the polarizing filter functional structure is controlled to be switchable between effective and ineffective, wherein when the functional state of the polarizing filter functional structure is effective, the polarizing filter functional structure absorbs one of two linear polarizing light components orthogonal to each other of an incident light; when the functional state of the polarizing filter functional structure is ineffective, all of the incident light is transmitted through the polarizing filter functional structure, and wherein, in a glasses type 3D displaying mode, only the first grating unit is controlled to function; in a naked-eye type 3D displaying mode, only the second grating unit is controlled to function.

2. The 3D display apparatus according to claim 1, wherein the grating functional structure comprises:

a first substrate and a second substrate disposed to be opposite to each other;

a liquid crystal layer between the first substrate and the second substrate;

wherein, a plurality of rows of pixel electrodes parallel to the horizontal direction are disposed on the first substrate, wherein the pixel electrodes in odd numbered rows are connected with each other and connected with a first lead line, and the pixel electrodes in even numbered rows are connected with each other and connected with a second lead line;

a plurality of rows of pixel electrodes parallel to the vertical direction are disposed on the second substrate, wherein the pixel electrodes in odd numbered rows are connected with each other and connected with a third lead line, and the pixel electrodes in even numbered rows are connected with each other and connected with a fourth lead line;

wherein, in a glasses type 3D displaying mode, the first, third and fourth lead lines are controlled to be connected with a common electrode, and the second lead line is controlled to be connected with a driving voltage Vop; or, the second, third and fourth lead lines are controlled to be connected with the common electrode, and the first lead line is controlled to be connected with the driving voltage Vop;

in a naked-eye type 3D displaying mode, the first, second and third lead lines are controlled to be connected with the common electrode, and the fourth lead line is controlled to be connected with the driving voltage Vop; or, the first, second and fourth lead lines are controlled to be connected with the common electrode, and the third lead line is controlled to be connected with the driving voltage Vop.

3. The 3D display apparatus according to claim 2, wherein a distance between adjacent rows of the pixel electrodes is 3-5 µm.

4. The 3D display apparatus according to claim 1, wherein the polarizing filter functional structure comprises:

a third substrate and a fourth substrate disposed to be opposite to each other;

liquid crystal molecules disposed between the third substrate and the fourth substrate and formed of a Nematic phase liquid crystal and a dichromatism dye;

wherein the original orientation of the liquid crystal molecules is parallel to the third substrate, and after applying electric field to the polarizing filter functional structure, the orientation of the liquid crystal molecules is vertical to the third substrate.

5. A manufacturing method to manufacture the 3D display apparatus of claim 1, comprising:

forming a liquid crystal display panel;

forming a first and second polarizing filters on both sides of the liquid crystal display panel;

wherein the manufacturing method further comprises:

forming a grating functional structure on the second polarizing filter, wherein a stripe direction of the grating functional structure is controlled to form a different predetermined angle with a horizontal direction, wherein the grating functional structure comprises a first grating unit on the second polarizing filter and a second grating unit on the first grating unit, wherein a stripe direction of the first grating unit is parallel to the horizontal direction, and a stripe direction of the second grating unit is parallel to a vertical direction, wherein, in a glasses type 3D displaying mode, only the first grating unit is controlled to function; in a naked-eye type 3D displaying mode, only the second grating unit is controlled to function;

forming a polarizing filter functional structure on the grating functional structure, wherein the functional states of the polarizing filter functional structure is controlled to be switchable between effective and ineffective, wherein when the functional state of the polarizing filter functional structure is effective, the polarizing filter functional structure absorbs one of two linear polarizing light components orthogonal to each other of an incident light; when the functional state of the polarizing filter functional structure is ineffective, all the incident light can be transmitted through the polarizing filter functional structure.

* * * * *